United States Patent

Haug

[11] Patent Number: 5,546,725
[45] Date of Patent: Aug. 20, 1996

[54] COMPOSITE ANCHOR

[75] Inventor: Willi Haug, Freudenstadt/Musbach, Germany

[73] Assignee: fischerwerke, Artur Fischer GMBH & Co KG, Waldachtal, Germany

[21] Appl. No.: 352,554

[22] Filed: Dec. 8, 1994

[30] Foreign Application Priority Data

Dec. 16, 1993 [DE] Germany .................. 43 42 887.8

[51] Int. Cl.$^6$ .................................................. E04B 1/38
[52] U.S. Cl. .................................................. 52/698
[58] Field of Search ............... 52/698, 344, 223.12, 52/426, 699, 700, 704

[56] References Cited

U.S. PATENT DOCUMENTS 3,108,443 10/1963 Schuermann et al. ............ 52/698
3,324,663 6/1967 McLean ............................. 52/698
3,925,996 12/1975 Wiggill ........................... 52/698 X Primary Examiner—Carl D. Friedman
Assistant Examiner—W. Glenn Edwards
Attorney, Agent, or Firm—Michael J. Striker

[57] ABSTRACT

The composite anchoring device consists of an anchoring rod (7) and a cartridge (3) capable of being crushed by the anchoring rod (7). The inner container (5) extends over the length (1) of the cartridge (3) and advantageously includes a central section (8), end sections (10) at each end of the inner container and conical sections (9) connecting each end section (10) with the central section (8). The inner container sections are crushable in succession as the anchoring rod is driven in. The individual container sections (10,9,8) have different volumes and are designed with first breakpoints (11) and second breakpoints (9') of graded resistance so that they are crushed in succession from the ends of the inner container towards the middle starting with the first breakpoints (11) in the end sections (10), and release water held in the respective inner container sections to the surrounding hardenable bonding agent to provide a stronger fixing.

9 Claims, 1 Drawing Sheet

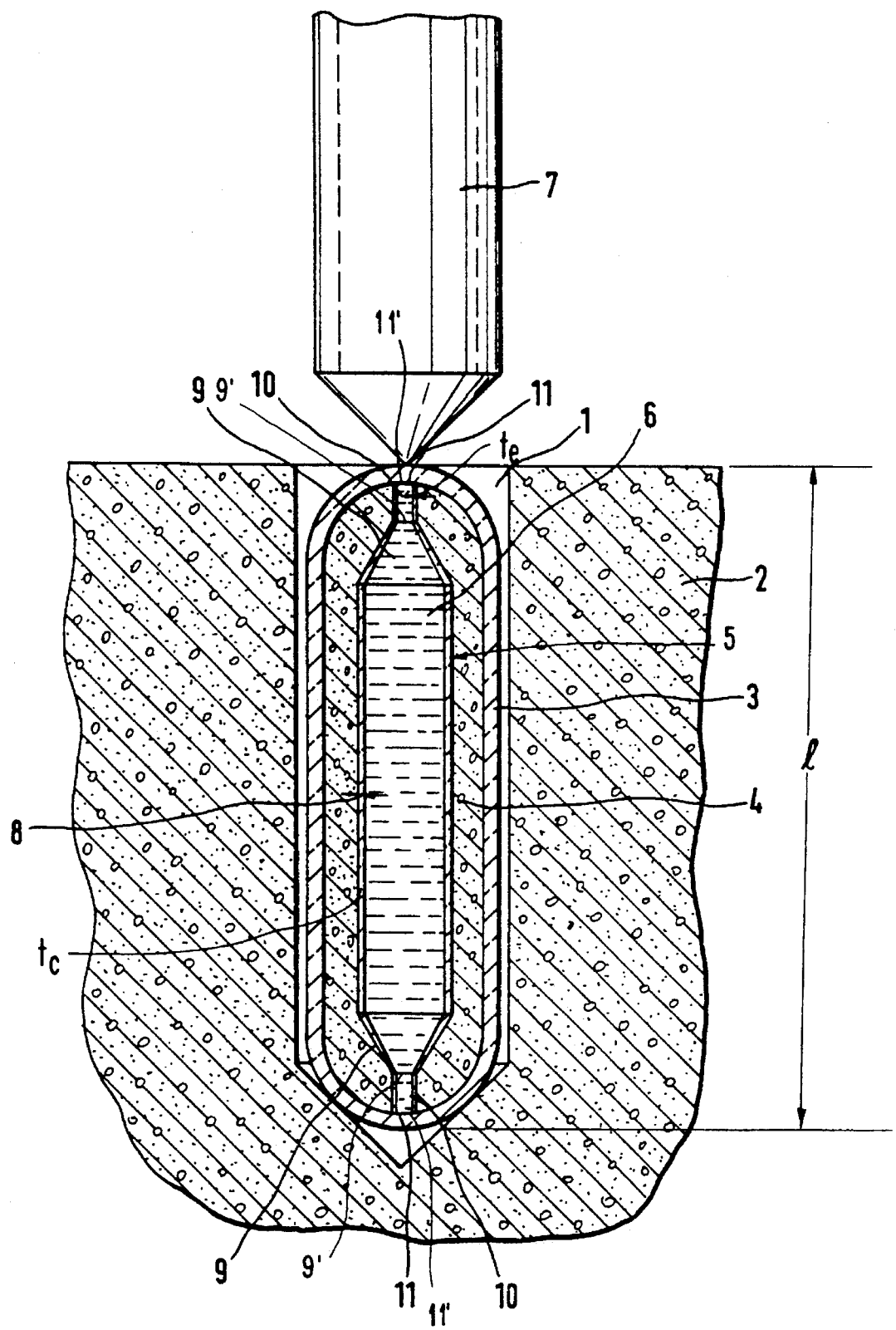

COMPOSITE ANCHOR

BACKGROUND OF THE INVENTION

The present invention relates to a composite anchor consisting of an anchoring rod and a cartridge capable of being crushed by the anchoring rod. The cartridge is filled with a hardenable bonding agent including a mineral mortar as solid component and has a crushable inner container encapsulating water as liquid component. The components are mixed by the anchoring rod to fix it in the drilled hole. The inner container consists of inner container sections which are distributed over the length of the cartridge, are separate from one another and are crushable in succession as the anchoring rod is driven in to release water in portions progressively.

German Published Patent Application DE 41 06 311 C1 discloses a composite anchor for fixing an anchoring rod in a drilled hole, in which an inner container encapsulating water is used. The inner container consists of inner container parts distributed along the length of the cartridge which are crushed individually in succession as the anchoring rod is driven in. In this particular case, the inner container is crushed starting from the mouth of the drilled hole inwards. Here, it can happen that mixing is ineffectual and hardening takes place at the entry region of the drilled hole. As a consequence, the pull-out values are inconsistent and dissimilar, depending on how individual mixing by the anchoring rod has taken place in a particular drilled hole.

SUMMARY OF THE INVENTION

It is an object of the present invention to provide an improved composite anchor in which better mixing of the bonding agent occurs in operation.

This object and others which will become more apparent herein after is attained in a composite anchor of the above-described type consisting of an anchoring rod and a cartridge capable of being crushed by the anchoring rod. The cartridge is filled with a hardenable bonding agent including a mineral mortar as solid component and has a crushable inner container contains water as liquid component.

According to the invention, the inner container extends over the entire length of the cartridge and consists of a plurality of inner container sections distributed over its entire length and including end sections at the respective ends of the inner container. The inner container sections are crushable in succession as the anchoring rod is driven into the drilled hole to release water progressively in portions. The inner container has first and second breakpoints, the second breakpoints being arranged further from the ends of the inner container than the first breakpoints. The first breakpoints have less resistance than the second breakpoints and break before them. In general the breakpoints are arranged to break in succession from each end of the inner container towards the middle of the inner container as the anchoring rod is driven into the drilled hole.

According to a preferred embodiment of the invention the respective inner container sections have different volumes.

The composite anchor according to the invention has a cartridge in which the inner container has predetermined breakpoints that are graded as regards their capacity to resist stress. As the anchoring rod is driven in, the inner container is destroyed from the two ends of the inner container towards the middle in succession at the individual predetermined breakpoints, so that the water in a particular section of the inner container is released into its surrounding area. Because the inner container is crushed starting from both ends, in the region of the upper half of the container the water is mixed at once with the mortar. The lower portion of liquid rises through the mortar from the lower end furthest inside the bore. Tests have shown that as a result the full location depth of the anchoring rod is achieved and better pull-out values are obtained. The construction according to the invention of the inner container is especially advantageous if the water has added to it an agent that prevents escape of the water regardless of the course of the drilled hole as the cartridge is crushed.

According to a preferred embodiment, the inner container is constructed so that at its two end sections it has tips which break when pressure is applied in an axial direction. This ensures that the two opposite tips of relatively small volume break first as the anchoring rod is driven in, and deliver the first liquid to the surrounding mortar. According to a further preferred embodiment, adjoining each end section there is a truncated cone-shaped section which has a somewhat stronger predetermined breakpoint at the adjoining, preferably cylindrically formed central section. This ensures a graded crushing of the inner container from each end towards the middle.

According to a preferred embodiment, the inner container is made from glass. Combined with the components of the bonding agent, the splinters of glass improve the bond and the fixing of the anchoring rod.

According to another preferred embodiment, the water is provided with a thixotropic agent which causes the water to behave as a paste in the absence of shear forces. Because of that, as the cartridge is crushed, the water component is consequently unable to escape regardless of the course of the drilled hole. The shear forces created by the rotating anchoring rod as it is pushed into the drilled hole liquefy the water component correspondingly as the anchoring rod advances, so that uniform saturation and mixing of the bonding agent is effected. Both the powder-form mortar and the water are bonded in the paste-like mixture so that there is no need to fear that one of the two components will escape from the drilled hole during the mixing operation, even when an overhead mounting is involved. In addition, only the water component that corresponds to the section of inner container that has just been crushed is delivered to the mortar. No water is therefore able to escape from the as yet uncrushed inner container section. Amorphous, pyrogenic silicic acid admixed with the water component in a proportion of 0.5 to 2% by weight has proved especially suitable as the thixotropic agent.

BRIEF DESCRIPTION OF THE DRAWING

The objects, features and advantages of the present invention will now be illustrated in more detail by the following detailed description, reference being made to the accompanying drawing in which the sole FIGURE.

DESCRIPTION OF THE PREFERRED EMBODIMENT

A cartridge 3 containing mineral mortar 4 and an inner container 5 is located in a drilled hole 1 in a component 2. The inner container 5 is filled with water 6 mixed with a thixotropic agent. When the inner container 5 is crushed, the water forms with the mineral mortar 4 a bonding agent for fixing the anchoring rod 7 in the drilled hole 1.

The inner container 5 extends for the length 1 of the cartridge 3 and is symmetrical with respect to an axis of symmetry running through the center of the inner container 5 and an axis of symmetry running transversely to it. The inner container 5 has a central cylindrical section 8, adjoining which at each end there is a conical section 9 which, in turn, is connected to a cylindrical end section 10. Each cylindrical end section 10 is discontinuous at its tip 11', so that there is a first breakpoint 11 at each tip which breaks first when pressure is applied to the inner container 5 by the anchoring rod 7. This pressure is caused by the anchoring rod 7 being driven into the drilled hole 1. As the anchoring rod 7 is driven further forwards, a second breakpoint 9' in each of the conical sections 9 at each end of the inner container 5 is the next to break since by virtue of their construction they are designed to break more easily than the central section 8, which is broken last of all by the effect of the force of the anchoring rod 7. The individual inner container sections of the inner container 5 have different wall thicknesses, the central section 8 having the largest thickness $t_c$ and the end sections 10 having the smallest wall thickness $t_e$.

Crushing of the inner container from each end improves mixing, and the full location depth of the anchoring rod is achieved as a result. It was possible to demonstrate improved pull-out values of the anchoring rod in tests.

The end section 10 of the inner container 5 is of very thin-walled construction and very fragile, and can be made together with the conical section 9 by drawing the glass blank after the container has been filled with the water component.

While the invention has been illustrated and embodied in a composite anchor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A composite anchoring device for fixing an anchoring rod (7) in a drilled hole (1), said anchoring device consisting of said anchoring rod (7) and a cartridge (3) having a length (1) and capable of being crushed by said anchoring rod (7), said cartridge (3) containing a hardenable bonding agent comprising a mineral mortar (4) as a solid component and said cartridge (3) also containing a crushable inner container (5) extending over the length (1) of the cartridge (3), having ends and filled with water (6) as a liquid component, said solid and liquid components being mixed by driving the anchoring rod (7) into the drilled hole (1) containing the cartridge (3) to crush the cartridge and fix the anchoring rod in the drilled hole, wherein the crushable inner container (5) held in the cartridge (3) consists of a plurality of inner container sections (10,9,8) distributed over the length (1) of the cartridge (3), delimited from each other and crushable in succession as the anchoring rod (7) is driven into the drilled hole (1) to release said water (6) progressively in portions, and the inner container (5) has first breakpoints (11) and second breakpoints (9'), said second breakpoints (9') being arranged further from said ends of said inner container (5) than said first breakpoints (11), wherein said first breakpoints (11) and said second breakpoints (9') are graded to have predetermined resistances to stress so as to break in succession from each of said ends of the inner container (5) towards a middle of the inner container (5) as the anchoring rod (7) is driven into the drilled hole (1) to release the water (6) located in the respective inner container sections (10, 9,8) to the mineral mortar (4) in the vicinity of the inner container sections.

2. A composite anchoring device as defined in claim 1, wherein the inner container sections (8,9,10) each have different volumes.

3. A composite anchoring device as defined in claim 2, wherein the inner container sections (8,9,10) include an end section (10) at each of said ends of the cartridge (3), one of said first breakpoints (11) being provided in each of the end sections (10) so that said end sections (10) at said ends of said inner container break simultaneously when pressure is applied to the cartridge (3) by the anchoring rod (7).

4. A composite anchoring device as defined in claim 3, wherein the inner container sections (8,9,10) include a truncated cone-shaped section (9) adjoining each of said end sections (10).

5. A composite anchoring device as defined in claim 4, wherein the inner container sections (8,9,10) include a central cylindrical section (8) adjoining both of the truncated cone-shaped sections (9).

6. A composite anchoring device as defined in claim 5, wherein the inner container (5) is made of glass.

7. A composite anchoring device as defined in claim 6, wherein the inner container sections (8,9,10) have different wall thicknesses $(t_c,t_e)$, said wall thicknesses $(t_c,t_e)$ increasing from each of the end sections (10) to the central section (8).

8. A composite anchoring device as defined in claim 1, wherein the water in the inner container is admixed with a thixotropic agent so that a paste-like substance including the thixotropic agent and the water is formed in the absence of shear forces.

9. A composite anchoring device as defined in claim 8, wherein the thixotropic agent is an amorphous, pyrogenic silicic acid and 0.5 to 2% by weight of said silicic acid is present in the water.

* * * * *